United States Patent
Sielaff

[15] 3,706,136
[45] Dec. 19, 1972

[54] VEHICLE MANEUVER INDICATOR

[72] Inventor: Ernst A. Sielaff, Cedar Rapids, Iowa

[73] Assignee: Collins Radio Company, Cedar Rapids, Iowa

[22] Filed: April 5, 1971

[21] Appl. No.: 131,382

[52] U.S. Cl. .................. 33/1 SD, 33/76 VA, 343/5 R, 343/112 PT
[51] Int. Cl. ........................... G01c 21/20, G01s 7/06
[58] Field of Search .................. 343/5 R; 33/1 SD

[56] References Cited

UNITED STATES PATENTS

| | | | |
|---|---|---|---|
| 2,540,110 | 2/1951 | Gall | 343/5 R X |
| 2,979,821 | 4/1961 | Tengwall | 33/1 SD |
| 3,526,963 | 9/1970 | Pansmith | 33/1 SD |

*Primary Examiner*—T. H. Tubbesing
*Attorney*—Richard W. Anderson and Robert J. Crawford

[57] ABSTRACT

A maneuver indicator device in the form of an overlay for a radar plan position indicator screen is disclosed. The device includes a fixed frame member extending annularly about the periphery of the radar screen, and a transparent rotatable cursor member rotatable with respect to the annular frame about an axis coincident with the sweep axis of the radar screen. Rotation of the cursor member to align parallel lines inscribed on its face with the relative velocity vector as defined by the radar returns of an intruding vessel, aligns command indicia on the cursor with maneuver indicating segments defined on the fixed frame member to provide a direct indication of evasive action in terms of speed and/or course change, and the relative effectiveness of these commands.

8 Claims, 10 Drawing Figures

VEHICLE MANEUVER INDICATOR

This invention relates generally to command indicators and more particularly to a maneuver indicator for attachment to a radar screen by means of which the master of a vessel or other vehicle is provided with an aid to decide quickly what evasive action, as by change of speed and/or course, to take if the radar echoes of an intruding vessel or vehicle indicate an imminent close quarter or collision situation.

The present invention will be described herein as it pertains to an improvement in evasive maneuvering as it applies to marine vessels. The invention is equally applicable to other types of vehicles restricted to maneuvers within a plane.

Masters of vessels at sea maneuver in encounter situations with other vessels in accordance with the International Steering and Sailing Rules. Ofttimes these rules have proved inadequate in preventing collision and the matter of collision has become a crucial situation, especially when one takes into account ships of all conventional sizes and speeds, hydrofoil craft, air cushion vehicles with much higher speeds, and finally surface effect craft having speeds comparable to those of aircraft. Further, an increasing number of vessels makes the danger of collision ever more imminent.

The use of radar for collision avoidance has not materially improved the situation. In many instances, the reason for a collision between radar equipped vessels has been determined as improper interpretation and evaluation of the observed radar echoes by the respective masters of the vessels. In particular, mistakes in plotting velocity vector diagrams from observance of radar echoes is found to be a contributing factor to error leading to collision.

The ever worsening conditions have resulted in considerations and discussion concerning a change in the steering and sailing rules. The present sailing rules establish evasive maneuvers for power driven vessels in dependence on the type of encounter, and are based on a situation definition of burdened and privileged vessel. Evasive maneuvers, as specified in the steering and sailing rules, state generally that (1) when two vessels meet end on or nearly end on, both have to turn to starboard, (2) when two vessels are crossing, the vessel which has the other on her own starboard side, shall keep out of the way of the other. In this case, only one vessel, the burdened vessel, maneuvers. The other vessel, the privileged vessel, keeps her course and speed; but if a collision cannot be avoided by the action of the burdened vessel alone, the privileged vessel shall take action to avert collision, (3) when one vessel overtakes another, the overtaking vessel does the maneuvering to avoid a collision. The overtaken vessel stands on. In this case again, only one vessel maneuvers.

The present invention is based on a consideration of the above three cases from the standpoint of efficiency and safety and has as a primary object thereof the provision of a simple maneuver indicator for placement over a radar screen by means of which the masters of each of two vessels involved in an encounter situation are caused always to take evasive action in a manner that the evasive action effected by the master of one vessel does not cancel out that taken by the master of the other.

A further object of the present invention is the provision of a maneuver indicator for use with a radar screen by means of which the master of a vessel is clearly informed of an evasive maneuver as to course and/or speed together with an indication of the relative efficiencies of each of the types of evasive action.

A still further object of the present invention is the provision of a maneuver indicator for use with a radar screen by means of which the evasive action of one vessel in a given encounter is always oppositely sensed to that commanded to the master of the other vessel such that in situations where but one of the two intruding vessels is radar equipped, the master of the radar equipped vessel may inform the other vessel by communication means the proper evasive action to take such that cancellation of respective evasive action is obviated.

The present invention is featured in the provision of a simple overlay device for placement over the screen of a radar receiver including a fixed frame member extending annularly about the periphery of the screen, and a second transparent rotatable cursor member rotatable about the fixed frame member and about an axis coincident with the sweep axis of the radar screen. Rotation of the cursor member to align parallel lines inscribed thereon with the relative velocity vector as defined by the radar returns of an intruding vessel, aligns command indicia on the cursor member with maneuver indicating segments defined on the fixed frame member to provide a direct indication of evasive action in terms of speed and/or course change, and the relative efficiencies of these commands.

These and other features and objects of the present invention will become apparent upon reading the following description with reference to the accompanying drawings in which.

Figure 1:
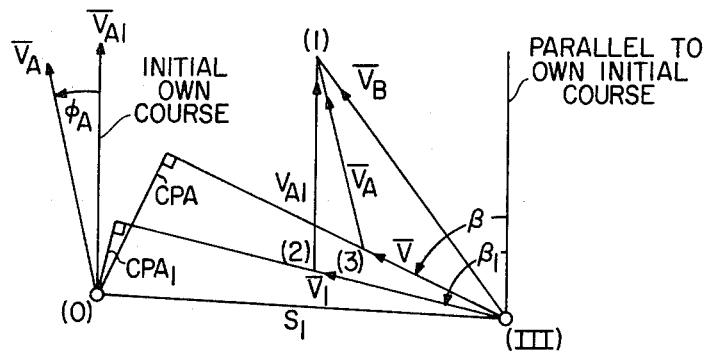
FIG. 1 is a vector diagram illustrating the effect of velocity change on existing miss distance between two vessels.

The significance of the maneuver indicator of the present invention might first be considered from a definitive discussion as to what the terms collision hazard and evasive action imply. One way of defining a collision hazard is to assign each vessel an area she can reach within a certain given time span. This area could be called a hazard region, and it could be said that a collision could not occur if the regions which the vessels carry along do not touch or overlap, and that if they touch or overlap, there is a possibility of collision.

A second definition of a hazard which is applicable to the present invention is based on maintenance of miss distance between vessels. Assuming that two vessels do not change course or speed, a collision hazard exists whenever the predicted separation of the vessels will become smaller than a desired separation of the vessels. This includes the true collision situation as well as close quarter situations.

From the latter definition of hazard follows the definition of evasive action. Evasive action should cause the vessels to be separated by at least a desired distance at all times.

From the above definitions of collision hazard and evasive action, it is seen that each of the definitions contains the time and a desired separation, which at the outset are not defined. Obviously these values will depend upon the size of the vessels involved, their maneuverability, the reliability of the measured data, the areas involved, the evaluation time and other factors, and would be of vital importance for the determination of the desired miss distance. These considerations are considered beyond the scope of the present invention and will not be treated herein. The assumption is made that these factors are optimally established and that a miss distance (closest point of approach) is established and is to be exceeded at all times.

It might further be stated that an evasive action between two vessels in a possible collision encounter situation should meet two essential requirements; namely, safety and efficiency. In terms of safety is implied the safety of not only the vessels encountered in the maneuver but consideration of multi-vessel encounters and the danger inherent if one vessel, due to its own evasive action, causes a threat to another one which can start a chain reaction. Consideration of this point leads to the obvious conclusion that any maneuver principle must prevent unnecessarily drastic action which cannot be tolerated in crowded seaways.

From the consideration of efficiency of a given evasive action, there are three points to be considered. First, there should always be a utilization of existing margins of safety, inferring that existing miss distances should never decrease, but always increase. Secondly, if two vessels participate in the maneuver, the action of one vessel should not counteract or cancel out the action of the other. Finally, the avoidance of a collision or a close quarter situation should be obtained by a minimum change in course and speed.

From the above it is seen that safety and efficiency requirements do not contradict each other. The increase of existing miss distances and the avoidance of canceling actions of two vessels are surely in the interest of safety as well as efficiency. A minimum change in course and speed, as required to be efficient, certainly will result in fewer undesired encounters with other vessels.

The evasive principles as provided by the maneuver indicator of the present invention might now be considered from a consideration of the geometry of evasive maneuvers as between two vessels at sea. The following nomenclatures and subscripts will apply:

Nomenclature:
| | |
|---|---|
| CPA | Distance of closest point of approach, miss distance |
| s | Separation |
| $\bar{V}$ | Velocity |
| V | Speed |
| β | Angle defining the direction of the relative velocity |
| η | Performance number |
| Φ | Angle of course change |

Subscripts:
| | |
|---|---|
| A | refers to the own vessel "A" |
| B | refers to the intruding vessel "B" |
| c | course |
| d | desired |
| p | predicted |
| s | speed |
| 1 | before the maneuver |
| 2 | after the maneuver |

With reference to FIG. 1, an evasive maneuver may consist of a change of course, a change of speed, or both. In FIG. 1 the "own" vessel A is located at (0) and is proceeding with velocity $\bar{V}_{A1}$. Vessel B is located at (III) and proceeds with velocity $\bar{V}_B$. The relative velocity of B with respect to A is $\bar{V}_1 = \bar{V}_B - \bar{V}_{A1}$, resulting in a miss distance $CPA_1$.

If it is assumed that vessel B stands on, which means that B does not change speed or course, and that vessel A changes her velocity from $\bar{V}_{A1}$ to $\bar{V}_A$ (meaning if vessel A changes her speed from $V_{A1}$ to $V_A$ and changes her course by an angle $\Phi_A$), the relative velocity between the two vessels becomes $V = V_B - V_A$, which results in a miss distance CPA, assuming instantaneous changes. It is seen that the maneuver of vessel A (namely a turn to port and a reduction in speed to $V_A < V_{A1}$) has resulted in an increase of the initial miss distance ($CPA > CPA_1$).

By an extension of the vector diagram encounter situation depicted in FIG. 1 to situations wherein the miss distances are located in all four conventional quadrants, the quadrants being numbered counterclockwise from the reference line ("own" ships heading) according to normal mathematical convention, investigation has shown that maneuvers which result in an increase of the existing or predicted miss distance for various encounter situations may be summarized as in Table 1 which indicates the type of maneuver that "own" vessel A is required to make to increase the existing miss distance. Special cases involving true collision courses wherein the predicted miss distances is zero or coincides with the own vessel's course or beam line will be further considered.

TABLE 1

| $CPA_1$ in QUADRANT | Maneuver Of Own Vessel | |
|---|---|---|
| | SPEED | TURN TO |
| I | Decrease | Starboard |
| II | Increase | Starboard |
| III | Increase | Port |
| IV | Decrease | Port |

Table 1 indicates the type of maneuver resulting in an increase of existing miss distance.

A further consideration of the encounter geometry between two vessels leads to the definition of a performance number as to the efficiency of a course change maneuver.

From FIG. 1 we see that an increase of $CPA_1$ means a change of $\sin\beta_1$ or $\beta_1$ since $CPA_1 \perp \bar{V}_1$. We define a performance number for course change only as:

$$\eta_c = \left| \frac{d\beta}{d\phi_A} \right| \qquad (1)$$

where $d\beta/d\Phi_A$ is evaluated for the initial conditions: $\beta = \beta_1$, $V = V_1$, $V_A = V_{A1}$, $\Phi_A = 0$. The performance number of the speed change only is defined as:

$$\eta_s = \left| \frac{d\beta}{d\left(\frac{V_A}{V_{A1}}\right)} \right| \qquad (2)$$

which is also evaluated for the initial conditions, where $dV_A$ is normalized or weighted with respect to $V_{A1}$. From FIG. 1:

$$\overline{V} + \overline{V}_A = \overline{V}_B$$

Since we assume that vessel B stand on, B does not change speed or course.

$$d(\overline{V}) + d(\overline{V}_A) = 0$$

or $$d(Ve^{i\beta}) + d(V_A e^{i\phi_A}) = 0$$

which yields $$dVe^{i\beta} + iVe^{i\beta}d\beta + dV_A e^{i\phi_A} + iV_A e^{i\phi_A} d\Phi_A = 0 \qquad 3.$$

Considering a course change only:

$$V_A = \text{constant}$$

$$dV_A = 0$$

Equation (3) becomes:

$$dVe^{i\beta} + iVe^{i\beta}d\beta = iV_A e^{i\phi_A} d\Phi_A = 0$$

Separating real and imaginary parts:

$$\frac{dV}{d\phi_A} \cos\beta - V\frac{d\beta}{d\phi_A} \sin\beta - V_A \sin\phi_A = 0$$

$$\frac{dV}{d\phi_A} \sin\beta + V\frac{d\beta}{d\phi_A} \cos\beta + V_A \cos\phi_A = 0$$

Eliminating $dV/d\Phi_A$:

$$(V)d\beta/d\Phi_A + V_A \cos(\beta - \Phi_A) = 0$$

And for the initial conditions at the start of the maneuver:

$$V = V_1, V_A = V_{A1}, \Phi_A = 0, \beta = \beta_1,$$

$$d\beta/d\Phi_A = -V_{A1}/V_1 (\cos\beta_1) \qquad 4.$$

Substituting equation (4) in equation (1), the performance number of the course change at the beginnings of the evasive action is:

$$\eta_c = \left| \frac{V_{A1}}{V_1} \cos\beta_1 \right| \qquad (5)$$

In the same way we can obtain $\eta_s$, the performance number for the speed change.

In this case $d\Phi_A$ in equation (3) becomes zero and we obtain:

$$\frac{dV}{dV_A} \cos\beta - V\frac{d\beta}{dV_A} \sin\beta + \cos\phi_A = 0$$

$$\frac{dV}{dV_A} \sin\beta + V\frac{d\beta}{dV_A} \cos\beta + \sin\phi_A = 0$$

Eliminating $\frac{dV}{dV_A}$ yields:

$$V\frac{d\beta}{dV_A} - \sin(\beta - \phi_A) = 0$$

or $$\frac{d\beta}{dV_A} = \frac{\sin(\beta - \phi_A)}{V} \qquad (6)$$

Normalizing equation (6) with $V_{A1}$:

$$\frac{d\beta}{d\left(\frac{V_A}{V_{A1}}\right)} = \frac{V_{A1}}{V} \sin(\beta - \phi_A)$$

and for the initial conditions at the beginning of the maneuver:

$$\frac{d\beta}{d\left(\frac{V_A}{V_{A1}}\right)} = \frac{V_{A1}}{V_1} \sin\beta_1 \qquad (7)$$

Substituting equation (7) in equation (2), the performance number for speed change only becomes $$\eta_s = V_{A1}/V_1 (\sin\beta_1) \qquad 8.$$

Equations (5) and (8) confirm the fact that the performance number or the efficiency of a vessel increases with $V_{A1}$, the "own" initial speed. For a pair of values $V_{A1}$ and $V_1$ the performance number of a speed or course change depends on $\beta_1$ only.

A further consideration as to the efficiencies of speed and course change maneuvers as expressed in (5) and (8) above as they apply to the evasive actions set forth by the current rules of the road, indicates that in certain cases the burdened vessel may not be able, due to the efficiency of a given speed or course change maneuver, to obtain the desired miss distance in an encounter when the privilege vessel "stands on." An analysis of various encounter situations involving various relative velocities and absolute velocities of the vessels involved clearly suggests the advisability, from the standpoint of safety and efficiency, that each vessel participate in an evasive maneuver. This dual-participation maneuver philosophy overcomes the following weaknesses of the present rules: (1) the burdened vessel may not have adequate maneuvering capability, (2) a burdened vessel, with little maneuvering capability may not be able to obtain a desired miss distance in spite of drastic speed and course changes, and (3) if the burdened vessel's action appears to be inadequate, the privileged vessel may initiate her evasive maneuver too late to avoid a collision.

The proposed maneuver diagram of the present invention is, therefore, based on the types of maneuvers outlined in Table 1 above along with consideration of the relative efficiencies of speed and course maneuvers as defined in the above expressions (5) and (8). If a collision or a close quarter situation is imminent, a maneuver diagram should give the master of the vessel instant information about the type of maneuver required and its efficiency. In accordance with the present invention this is realized by a diagram representing the types of maneuvers of Table 1 above and incorporating indication of relative speed and course change maneuver efficiencies as set forth in expressions (5) and (8) above.

Figure 2:
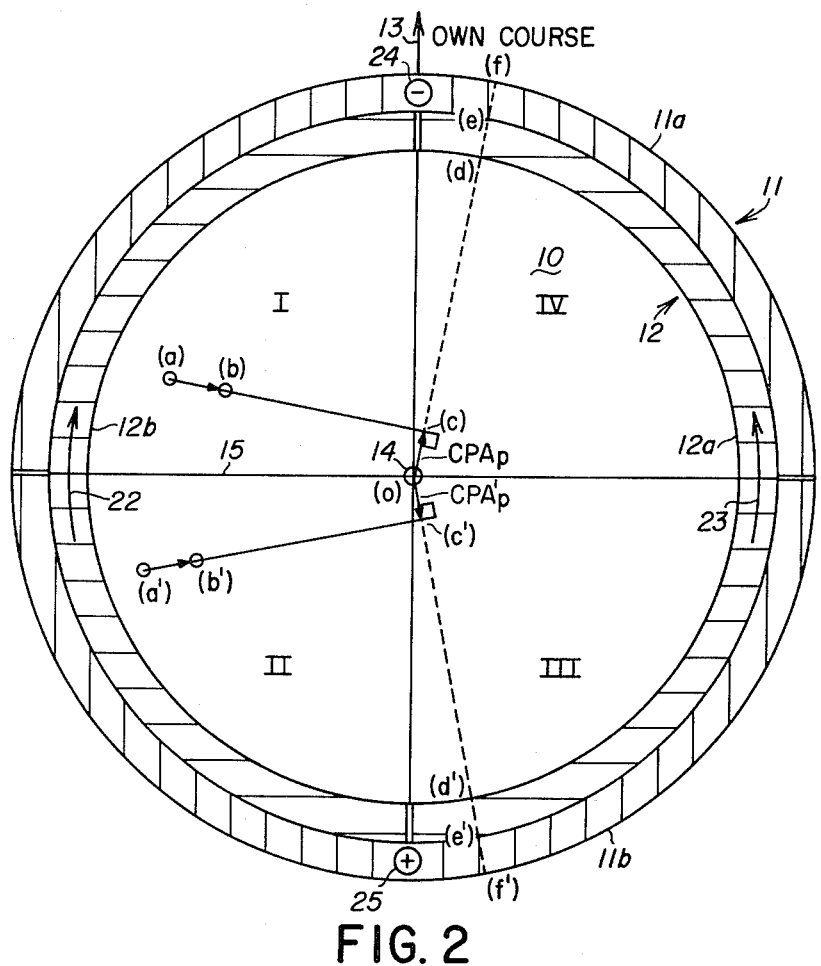
FIG. 2 is a diagram indicating the type of required maneuver, in accordance with the principles of the present invention, for collision avoidance.

FIG. 2 illustrates a basic diagram which indicates the type of required maneuver in accordance with the above Table 1. FIG. 2 illustrates a radar plan position indicator screen 10 surrounded by two concentric annular areas 11 and 12. Annular area 12, shaded with horizontal lines, refers to course change and the outer annular area 11, shaded by vertical lines, refers to speed change. The inner annular area 12 is divided by the vessels' "own course" or lubber line 13 into left and right half segments indicating a turn to starboard and port, respectively, as shown by the arrows 22 and 23. The outer area 11 is divided by the vessel beam line 15 into upper and lower half segments indicating a decrease and increase in speed respectively, as shown by the − and + signs 24 and 25.

The course of the "own" vessel in FIG. 2 is depicted by the vertical lubber line 13. In standard PPI orientation, location of the "own" vessel is at the center 14 of the screen 10, designated as point (0). A first encounter situation is depicted in FIG. 2 by radar echoes from an intruder vessel received at successive time intervals, as depicted at points (a) and (b). A line draw through points (a) and (b) defines the line of action (relative velocity) of an intruding vessel B with respect to the own vessel A. A line (o)–(c), drawn perpendicular to the line of action through points (a) and (b), represents the predicted miss distance $CPA_p$. In this example, the predicted miss distance $CPA_p$ is located in quadrant IV. The straight line (o)(c)(d)(e)(f) intersects the inner and outer annular areas 12 and 11 in hemispherical segments 12a and 11a, respectively, indicating a turn to port and a decrease in speed as a maneuver command.

A second example is illustrated in FIG. 2 by the successive radar echoes of an intruding vessel B occurring at points (a') and (b') respectively, locating the intruding vessel in quadrant II. A line drawn from the center of the scope 14 from point (0) to point (c') on an extension of the action line defined by radar echoes (a') and (b'), defines a predicted miss distance $CPA'_p$, lying in the third quadrant. The line (o)(c')(d')(e')(f') formed by an extension of the predicted miss distance (o)–(c'), intersects the annular indicating areas 11 and 12 in sections 11b and 12a, respectively, indicating a maneuver command in the form of a turn to port and an increase in speed. It is thus seen that the diagram of FIG. 2, represents the maneuver rules outlined in the above Table 1, that is, the diagram of FIG. 2 indicates the recommended types of maneuver.

Previous discussion indicated that the relative efficiencies of the maneuvers (see equations (5) and (8)) are dependent upon $V_{A1}/V_1$ (the ratio of the speed of the "own" vessel before the maneuver to the relative speed between vessels prior to maneuver), but the efficiency $\eta_c$ of a course change depends on the cosine and the efficiency $\eta_s$ of a speed change upon the sine of the angle $\beta_1$. Relative efficiencies of the selected type of maneuver, as is graphically depicted in FIG. 2, may, therefore, be represented in the maneuver diagram by making the distance (d)–(e), the radial dimension of the inner (course change) area equal to the absolute value of the cosine of the corresponding angle $\beta_1$ and by making the distances (e)–(f), the radial dimensions of the outer (speed change) area, equal to the absolute value of the sine of the corresponding angle $\beta_1$. The incorporation of efficiency indication into the basic maneuver type diagram of FIG. is illustrated in FIG. 3.

With reference to FIG. 3, the inner circle again represents the edge of the radar screen 10. The diagram defines four command indicating areas. Two of these areas, $11_a$ and $11_b$, are shaded vertically and indicate type and efficiency of a speed change, with + meaning an increase and − meaning a decrease in speed. The other two areas, $12_a$ and $12_b$, shaded horizontally, indicate type and efficiency of a course change (a turn to starboard and port, respectively). The relative direction of turns are indicated again by the arrows 22 and 23. The diagram is read according to the previously described situation with respect to FIG. 2. The maneuver diagram of FIG. 3, in addition to indicating the type of maneuver, provides an indication of the relative efficiencies of the course and speed changes, commanded for a particular situation. The radial dimension of the speed change areas is proportional to $\cos \beta$, while the radial dimension of the course change areas is proportional to $\sin \beta$.

Figure 3:
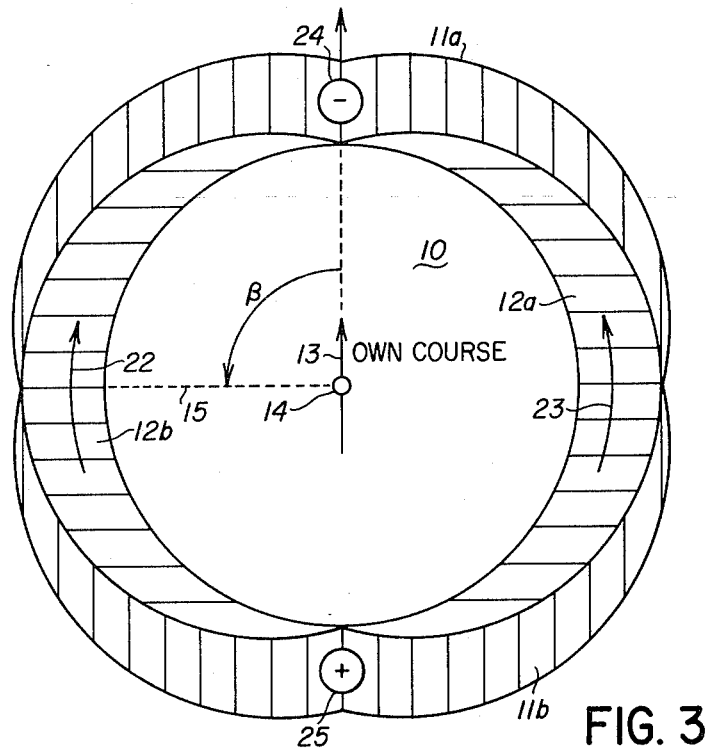
FIG. 3 illustrates the basic maneuver diagram frame member for placement about a radar screen for indication of course and speed changes and the relative efficiencies of these respective maneuvers.
Figure 4:
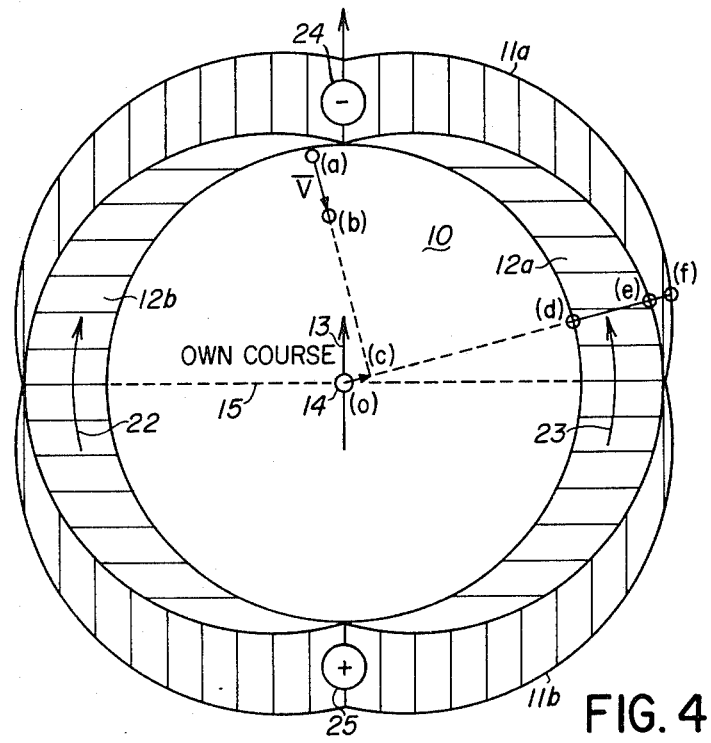
FIGS. 4 and 5 are diagrammatic representations of radar screen depicted encounters in conjunction with the basic maneuver diagram, illustrating the diagram application.
Figure 5:
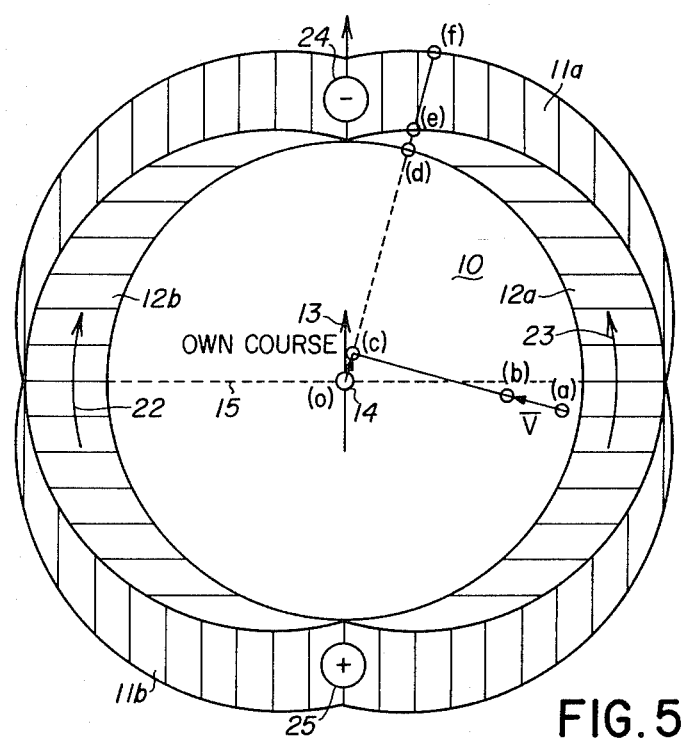

FIGS. 4 and 5 represent the application of the maneuver diagram of FIG. 3, illustrating respective situations where the relative efficiency of a commanded change in course is respectively greater and less than that of a commanded change in speed maneuver.

In each of FIGS. 4 and 5, the points (a) AND (b) represent two respective echoes from an intruding vessel defining a relative velocity vector $V$ which results in a predicted miss distance (o)–(c). The miss distance is assumed to be smaller than a desired miss distance $CPA_d$ and a maneuver is, therefore, commanded. The extension of line (o)–(c), drawn perpendicular to the action line (a)–(b) intersects the maneuver diagram at points (d), (e), and (f). In each of the situations depicted in FIGS. 4 and 5, (d)–(e) indicates a turn to port and (e)–(f) indicates a reduction in speed, in order to increase the existing miss distance (o)–(c) ($CPA_p$). In the case of FIG. 4, (d)–(e) is greater than (e)–(f) or $\eta_c > \eta_s$, which means that the course change is more effective than the reduction in speed. In the case of FIG. 5, (e)–(f) is greater than (c)–(e) which indicates the higher efficiency of a speed change ($\eta_s > \eta_c$).

It is noted that FIG. 4 places an intruding vessel ahead of the "own" vessel, while the situation of FIG. 5 places the intruding vessel to the starboard side of the "own" vessel. The command indicator configuration to display relative command efficiencies becomes clear by considering the following two unique cases.

1. The predicted miss distance coincides with the "own" beam line 15, which means that the line of action of the relative velocity vector $V$ is parallel to the "own" course line 13. This implies that the vessels are on parallel courses. Obviously a change in speed will not have any effect on the miss distance. For this case the diagram would indicate a performance factor of zero for speed changes and a maximum efficiency for course change.

2. The predicted miss distance coincides with the "own" course line, which means that the line of action of the relative velocity vector $V$ is parallel to the "own" beam line 15. For this condition the diagram would indicate that at the beginning of the evasive maneuver a course change would have a performance factor of zero and a speed change is of maximum efficiency.

Figure 6:
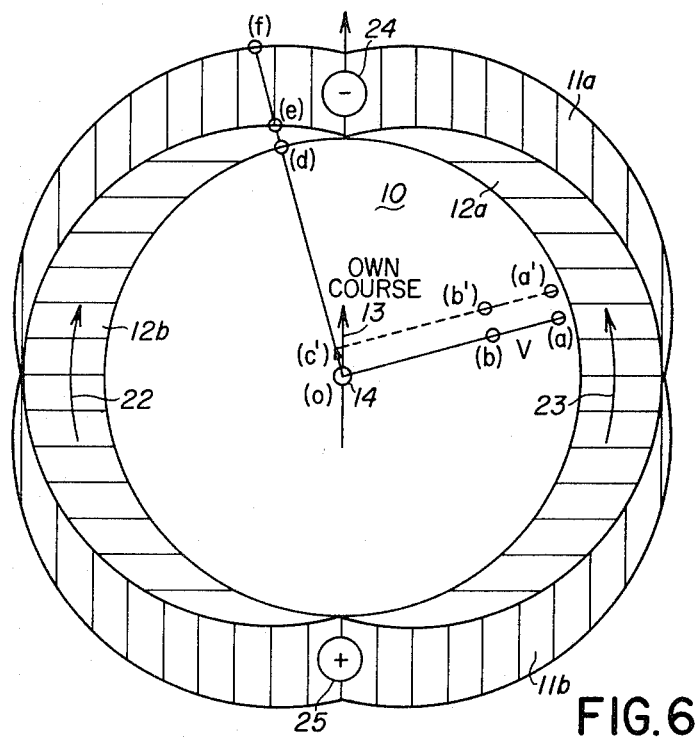
FIGS. 6 and 7 represent applications of the maneuver diagram of the present invention in true collision cases.
Figure 7:
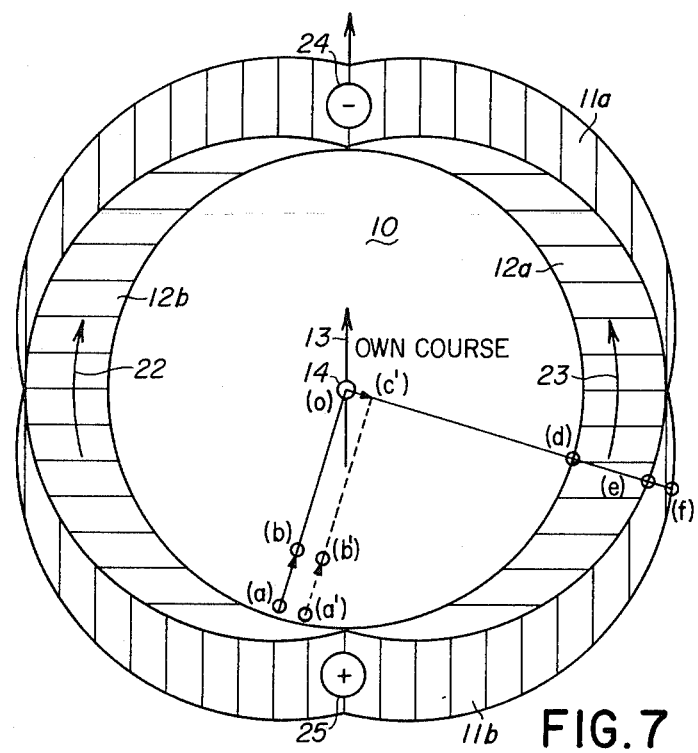

The cases in which the predicted miss distance (o)–(c) is zero, implying that the vessels are on a true collision course, will now be discussed. For this situation, since $CPA_p = 0$, the diagram is used by application of a fictional predicted miss distance (o)–(c), perpendicular to the relative velocity vector defined by (a)–(b), which would result in a counterclockwise "rotation" or displacement of the sight line. This situation is illustrated in FIGS. 6 and 7. In each of the encounter situations depicted in FIGS. 6 and 7 the lines of action of the relative velocity between the vessels passes through point (o) the location of the "own" vessel, thus indicating a zero miss distance (true collision course). A counterclockwise "rotation" or displacement of the sight line defined by echoes (a) and (b) would take place if the line (a)–(b) were translated to the positions (a') and (b') with (a)–(b) being parallel to (a')–(b'). This counterclockwise parallel translation of the sight line establishes the direction of a frictional miss distance (o)–(c) for which the maneuver diagram may be interpreted in the normal manner. In the case of FIG. 6 the diagram indicates a turn to starboard and a reduction in speed, while the situation of FIG. 7 calls for a turn to port and an increase in speed. In each case the sight line, as determined by the radar echoes of the intruding vessel, extends through the center of the radar screen, and thus through the location of the "own" vessel. By employing a consistent conception of a fictional miss distance by a clockwise translation of the actually observed sight line, and extension of the fictional miss distance thus established to read maneuver commands, the diagram serves to provide maneuver commands fully consistent with the previously discussed encounter situations wherein $CPA_p$ is real. It might further be noted that the procedures depicted in FIGS. 6 and 7, which establish a fictional predicted miss distance, based on an assumed counterclockwise rotation or translation of the actual sight line, result in the same types of maneuver as those obtained by current standard rules.

Application of the maneuver diagram of the present invention requires that in the case of a collision hazard, both vessels participate in the evasive action. If both vessels initiate their evasive maneuvers according to the maneuver diagram as above described, the maneuvers will always result in an increase of an existing miss distance. The actions of the two vessels will not cancel each other out, and the deviation from the initial course and speed will be kept to a minimum; since the faster, more efficient vessel always participates, and both ships' masters can determine the most efficient maneuver from their respective diagrams.

Figure 8:
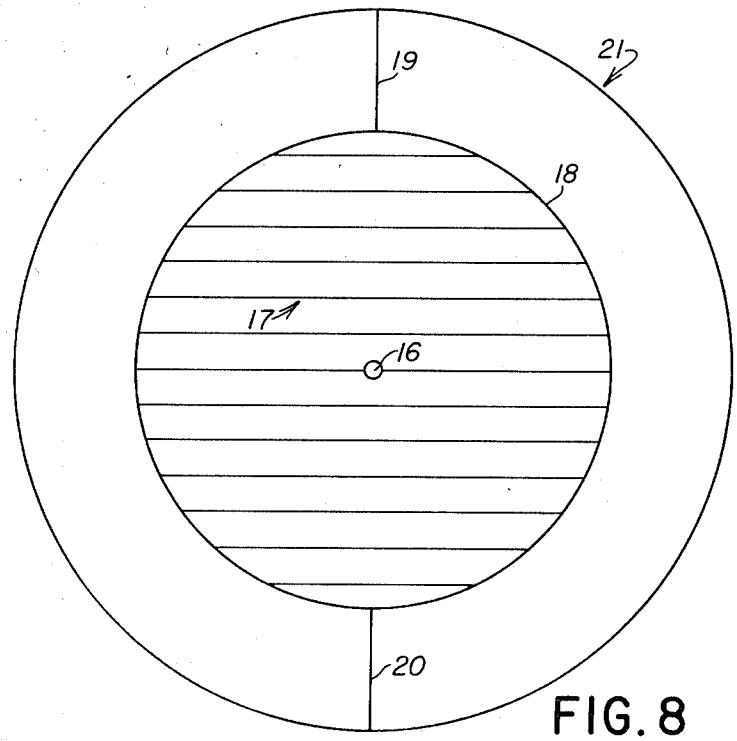
FIG. 8 illustrates the rotatable cursor overlay portion of the maneuver indicator of the present invention.

The application of the maneuver diagram is facilitated by incorporating a circular transparent cursor overlaying the maneuver diagram depicted in FIG. 3. With reference to FIG. 8, the circular transparent cursor 21 is formed with an inner circle 18 corresponding to the inner circle of the previously described maneuver diagram and also peripherally coinciding with the radar screen. While the maneuver diagram is affixed rigidly about the radar screen, the cursor 21 is rotatable with respect to the radar screen about the cursor center 16, which would be coincident with the centers of the radar screen and maneuver diagram. The annular ring formed between the inner circle 18 and the outer edge of the transparent cursor is divided into two hemispherical segments by lines 19 and 20, the latter being used to read the maneuver diagram.

In application, the cursor is rotated until the paralleled lines 17 on the cursor face are aligned parallel to the line of action (the relative velocity vector) between vessels. The reading of the maneuver diagram is taken at that one of the cursor reading lines 19 and 20 which lies on the extension of the predicted miss distance $CPA_p$, which means the extension of the line referred to in this description as line (o)–(c).

Since the maneuver reading lines 19 and 20 on the cursor overlay of FIG. 8 are perpendicular to the plurality of paralleled lines 17 on the cursor which are positioned with the course of action for a particular encounter, it is noted that the lines 19 and 20 serve as the previously discussed extension of the predicted miss distance as defined by the geometry of the encounter.

Figure 9:
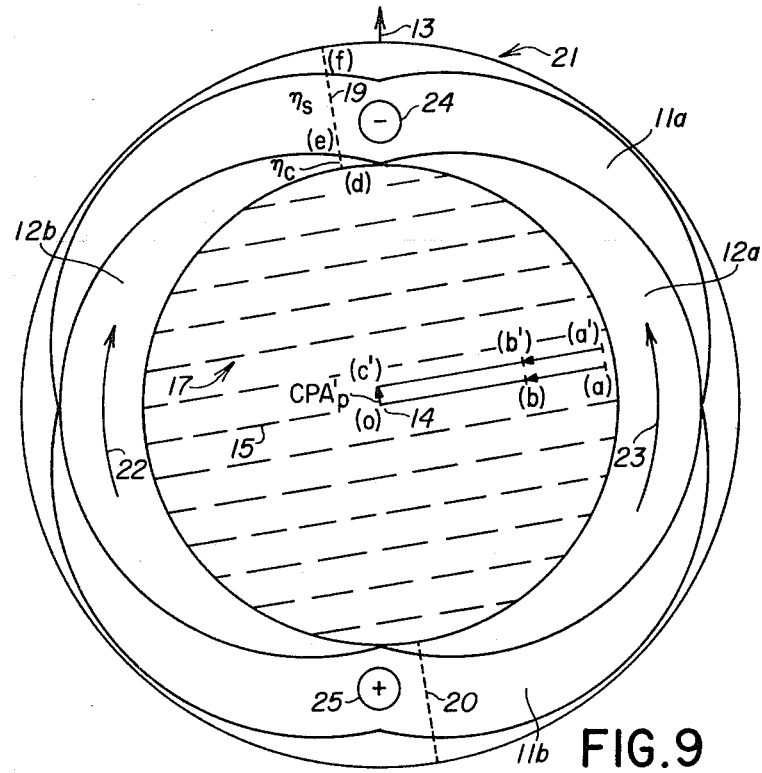
FIGS. 9 and 10 represent the respective applications of the rotatable overlay cursor for a given encounter situation as it applies to the masters of each vessel in an encounter.
Figure 10:
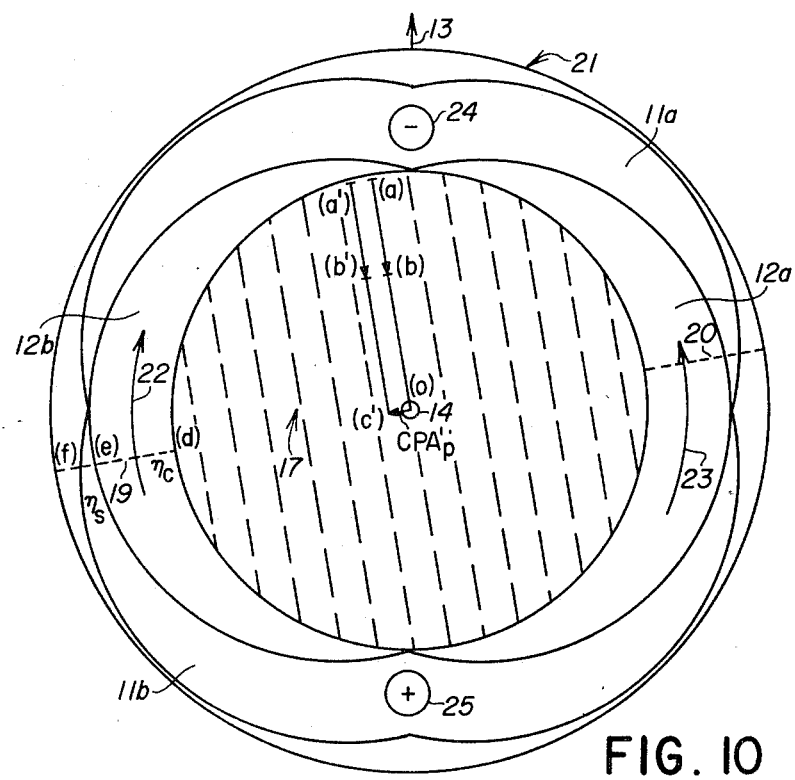

The use of the cursor in reading the maneuver diagram may best be comprehended from a consideration of actual encounter examples. FIGS. 9 and 10 represent the application of the cursor for each of two vessels A and B for a given encounter situation. A true collision course encounter is depicted in FIGS. 9 and 10 where the line of action through the points (a) and (b) of the radar return from an intruding vessel passes through the center of the scope at point (o) of the "own" vessel, indicating a zero miss distance. In accordance with the previously described standard interpretation for a collision course situation, the line of action defined by radar returns (a) and (b) is shifted or rotated in a counterclockwise direction to a hypothetical position defined by line (a')–(b')–(c') to result in hypothetical predicted miss distance $CPA'_p$. In using the cursor, the parallel lines 17 on the cursor are aligned so as to be parallel with the course of action defined by radar returns (a) and (b) and, for the collision course situation depicted, the direction of the fictional predicted miss distance $CPA'_p$ is towards reading line 19 on the cursor overlay 15. The previously described reading segments (d)–(e) and (e)–(f) are then read against the underlying segments of the maneuver diagram. In the encounter situation of FIG. 9 the reading line 19 is seen to be an extension of the fictional predicted miss distance $CPA'_p$, and gives the readings (d), (e), and (f) from the maneuver diagram which call for a reduction in speed and a turn to starboard. Since the radial length of the speed change command area underneath line 19 is greater than that of the course change segment under the line 19, the master of vessel A would only reduce the speed and maintain present course, since the speed maneuver is far more efficient.

FIG. 10 illustrates the FIG. 9 encounter situation as seen on the radar screen of the other vessel B. In this case the maneuver diagram indicates an increase in speed and a turn to starboard. Since in FIG. 10, efficiency of the course change command exceeds that of the speed change command by an appreciable factor, the master of vessel B would choose to turn to starboard and to maintain his speed. Actually the situation depicted in FIGS. 9 and 10 can be shown to be an encounter situation where, under the existing rules which define burdened and privileged vessels — with the burdened vessel only making the maneuver and the privileged vessel standing on, a desired miss distance may not be obtainable by a maneuver of vessel A only. However, miss distance is easily achieved if both vessels participate according to their respective maneuver diagrams as commanded in FIGS. 9 and 10.

Thus far the description has assumed that both vessels are equipped with radar in working order and that the observed echoes indicate the hazard condition clearly. Assumption has further been made that the maneuver diagrams are properly used by vessels A and B. This, of course, may not always be the case. If for some reason only one vessel (for example, vessel A) can utilize her radar and maneuver diagrams properly, vessel A should be able to communicate to vessel B what type of maneuver vessel B should initiate in order to avoid canceling action. If the master of vessel A has determined the proper evasive maneuver of his own vessel by radar and the maneuver diagram of the invention, he necessarily has to know what type of maneuver vessel B should initiate to avoid canceling action. By velocity diagrams of various maneuvers it can be shown that, in order to increase the existing miss distance and to avoid canceling action, the master of vessel B must follow a very simple rule: if A operates according to the diagram, B changes her speed in a sense opposite that of A and changes course opposite to the sense of rotation of the sight line.

In the true collision case vessel B always turns to starboard, according to the convention of diagram interpretation set forth herein that the fictional predicted miss distance on the screen of vessel A produces counterclockwise rotation of the sight line. It is thus seen that the master of any one vessel in a two vessel encounter is able to determine the type of maneuver the master of the other vessel should make to avoid canceling action and such information could be relayed by radio or other communication means. In the normal situation of both vessels being equipped with radar in proper operation, the master of each vessel is continuously apprised of the type of maneuver to increase the existing predicted miss distance and the indicator of the present invention inherently obviates canceling maneuvers on the parts of the two vessels. Thus the maneuver indicator of the present invention, attached to a radar screen, permits the master of a vessel to decide quickly what evasive action (change of speed and/or course) to take if the radar echoes of an intruding vessel indicate an imminent close quarter situation or collision, and tells the master whether the speed or course change of his own vessel is more effective and what type of maneuver the intruding vessel should take. The evasive maneuver as determined from the indicator of the present invention always increases existing miss distance and eliminates the possibility that the action of one vessel cancels out the effect of the other vessel's maneuver.

Although the present invention has been described with respect to a particular embodiment thereof, it is not to be so limited as changes might be made therein which fall within the scope of the invention as defined in the appended claims.

I claim:

1. A maneuver indicator for use in conjunction with a radar plan position indicator screen comprising an annular frame member adapted to be rigidly affixed to and extending about the periphery of said radar indicator, said frame member having formed on the surface thereof first, second, third, and fourth segmented areas, first and second ones of said segmented areas extending about respective forward and aft semi-circular portions of said plan position indicator viewing screen, said third and fourth ones of said segmented areas extending about the respective port and starboard semi-circular portions of said plan position indicator viewing screen, said first and second segments being visually coded to present commands representing respective decreases and increases in ship's speed, said third and fourth segments being visually coded to present interpretable commands representing respective port and starboard turn maneuvers, a second annular member carried over said frame member and said plan position indicator viewing screen and being rotatable about an axis coincident with the center axis of said plan position indicator, said second member comprising an outer annular ring coextensive with that of said frame member and carrying thereon index lines lying on a diameter of said annular ring, said second member being rotatable to align said index lines perpendicular to the relative velocity vector of an intruding vessel as depicted by radar returns on said plan position indicator screen, whereby a predetermined one of said index lines is positioned over a predetermined segment pair on said frame member to indicate a composite speed and turn maneuver the initiation of which increases the miss distance between vessels over that existing prior to said maneuver.

2. A maneuver indicator as defined in claim 1 wherein said segments on said frame member include means defining predetermined relative maneuver efficiencies of the respective speed and course change commands defined thereby, said efficiencies varying as functions of the angular position of said second member with respect to said frame member.

3. A maneuver indicator as defined in claim 1 wherein said first and second segmented areas on said frame member are formed concentrically about said third and fourth segmented areas, and each of said first and second, and second and third segmented area pairs being defined by radial dimensions varying respectively as the absolute values of the cosine and sine functions of the relative angle between said second member index lines and the instant course of a vessel carrying said maneuver indicator.

4. A maneuver indicator as defined in claim 1 wherein said second member comprises means facilitating a predetermined angular orientation of said second member with respect to said frame member, whereby said second member index lines extend perpendicular to the observed line of action of an intruding vessel as defined by sequential radar returns on said plan position indicator screen.

5. A maneuver indicator as defined in claim 4 wherein said second member further comprises a plurality of paralleled lines extending on the face thereof transverse of said diametrically extending index lines the parallel alignment of which with the relative velocity vector between an intruding vessel and the vessel carrying said maneuver indicator defines the one of said first and second diametrically extending index lines on said second member utilized for command interpretation for a particular maneuver as that one comprising an extension of the radial defined by the observed miss distance between vessels.

6. A maneuver indicator as defined in claim 1 wherein said first segmented area on said frame member exhibits visual command information indicative of a decrease in ship's speed, said second segmented area exhibits visual command information indicative of increase in ship's speed, said third segmented area exhibits visual command information indicative of a starboard turn, and said fourth segmented area exhibits visual command information indicative of a port turn.

7. Means for providing maneuver commands for a first vessel on predetermined course so as to increase the miss distance between said first vessel and a second intruding vessel on predetermined course comprising means for establishing a decrease in speed command when the relative velocity vector of said intruding vessel defines a miss distance extending forward of the bow of said first vessel, means for establishing an increase in speed command when the relative velocity vector of said intruding vessel defines a miss distance extending astern of said first vessel, means for establishing a port turn maneuver command when the relative velocity vector of said intruding vessel defines a miss distance extending to the starboard side of said first vessel, means for establishing a starboard turn maneuver command when the relative velocity vector of said intruding vessel defines a miss distance extending to the port side of said first vessel, and means for proportioning said speed change and turn maneuver commands in accordance with the relative efficiencies of said commands as defined by the intercept geometry of said vessels.

8. Means for providing maneuver commands as defined in claim 7 wherein said means for proportioning comprises means for establishing respective speed change and turn maneuver command magnitudes in proportion to the absolute values of respective cosine and sine functions of the relative bearing between the line of action of said second intruding vessel and the instant heading of said first vessel.

* * * * *